United States Patent [19]

Weibel

[11] Patent Number: 5,069,919

[45] Date of Patent: Dec. 3, 1991

[54] PROCESS FOR BLEACHING/SANITIZING FOOD FIBER

[75] Inventor: A. Thomas Weibel, Cranbury, N.J.

[73] Assignee: FMC Corporation, Philadelphia, Pa.

[21] Appl. No.: 600,658

[22] Filed: Oct. 22, 1990

Related U.S. Application Data

[63] Continuation-in-part of Ser. No. 564,242, Aug. 8, 1990.

[51] Int. Cl.[5] .......................... C12P 7/10; C13K 1/02; D21C 3/26
[52] U.S. Cl. .................................. 426/261; 426/658; 426/804; 127/37; 127/1; 8/139; 8/111
[58] Field of Search .............. 426/253, 254, 258, 261, 426/658, 804; 127/37, 1; 8/139, 111

[56] References Cited

U.S. PATENT DOCUMENTS

| | | | |
|---|---|---|---|
| 1,380,334 | 5/1921 | Sutherland . | |
| 2,777,749 | 1/1957 | Young | 8/104 |
| 3,939,286 | 2/1976 | Jelks | 426/312 |
| 4,307,121 | 12/1981 | Thompson | 127/37 |
| 4,312,634 | 1/1982 | Katz | 8/139 |
| 4,314,854 | 2/1982 | Takagi | 127/37 |
| 4,511,433 | 4/1985 | Towinier et al. | 127/37 |
| 4,649,113 | 3/1987 | Gould | 435/165 |
| 4,689,117 | 8/1987 | Villavicencio | 162/19 |
| 4,774,096 | 9/1988 | Nickel et al. | 426/253 |
| 4,806,475 | 2/1989 | Gould | 435/165 |
| 4,842,277 | 6/1989 | Tyson | 127/37 |
| 4,919,952 | 4/1990 | Sadaranganey et al. | 426/254 |

Primary Examiner—Jeanette Hunter
Attorney, Agent, or Firm—R. E. Elden; P. C. Baker; R. L. Andersen

[57] ABSTRACT

A high yield process is provided for treating lignocellulose food fiber to sanitize and bleach the fiber. The process is not only a high yield process but produces better or equivalent bleaching than alternative processes and further does not produce a waste disposal problem. The process also has the advantage of requiring very little energy compared to alternative processes.

8 Claims, No Drawings

PROCESS FOR BLEACHING/SANITIZING FOOD FIBER

This is a continuation-in-part of pending U.S. application Ser. No. 564,242 filed Aug. 8, 1990.

A process is provided for treating lignocellulose food fiber to provide a high yield of a bleached, sanitized product.

The importance of dietary fiber for use in the human and nonhuman system cannot be overemphasized. Dietary fiber plays a major role in health and disease resistance, physiological metabolism, and in preventive medicine. There has been considerable effort in the development of fiber-containing foods in order to benefit from the advantages of dietary fiber in the system. Many of these materials can be used as an effective carbohydrate and energy source in ruminant feeds. In order to do this some residues must be treated to remove much or all of the lignin portion, resulting in low yields and a corresponding large waste disposal problem.

Monogastrics, such as humans, lack the ability to convert cellulose into a carbohydrate food. Therefore, it is undesirable to convert a beneficial natural lignocellulose fiber into cellulose and concomitantly create a large waste stream. However, some treatment is desirable, either to sanitize the fiber, or to bleach it if it is to be incorporated into a light colored comestible, such as white bread.

Alkaline hydrogen peroxide has been long known as a bleaching agent for cellulosic materials such as cotton, wood pulp and the like. However, it is well known that bleaching with hydrogen peroxide takes place at a pH of 8.5 or greater. For bleaching groundwood which has a high lignin content the optimum initial pH is about 10.0 to 10.5 at a pulp consistency of 12%.

U.S. Pat. Nos. 4,649,113 and 4,806,475 to Gould disclose a process for the delignification of agricultural residues to product cattle feeds, chemical feeds or dietary fibers through the separation of these components. The agricultural crop residues and other non-woody lignocellulosic plant substrates are treated with hydrogen peroxide at a controlled pH within the range of about 11.2 to 11.8. The substrates are partially delignified, lowering the yield.

U.S. Pat. No. 4,842,877 to Tyson teaches a process to produce food grade fiber by a multiple step process. The process delignifies the fiber at pH 11.5 and subsequently removes the hemicellulose. The process is undesirable in that it has a high capital cost and results in a low yield and produces a large waste stream.

U.S. Pat. No. 3,939,286 to Jelks teaches a low yield process for treating plant organic matter with acid to increase the digestability by ruminants.

U.S. Pat. No. 4,774,096 to Nickel et al. claims a low yield (~65%) process to convert the outer seed coat of legumes, such as peas, to a fibrous product. The process produces an undesirably large quantity of waste which must be treated. Hydrogen peroxide is employed in one of the steps to solubilize material from the fiber.

Hydrogen peroxide and other peroxygens have been employed to modify carbohydrates such as flour and starch. U.S. Pat. No. 1,380,334 discloses that hydrogen peroxide can be substituted for nitrogen dioxide to improve the gluten in flour while avoiding a browning effect. U.S. Pat. No. 2,777,749 to Young discloses that flour and corn starch in the presence of tetrasodium pyrophosphate can be bleached and oxidized with hydrogen peroxide vapors.

The present invention is a high yield process for treating a lignocellulose fiber substrate comprising:

a) uniformly distributing a sufficient quantity of an aqueous solution containing hydrogen peroxide over the lignocellulose fiber substrate to provide as a reaction mixture about 5 to about 15 parts by weight hydrogen peroxide per hundred parts by weight dry lignocellulose fiber substrate and water to provide about 40 to 70 parts lignocellulose fiber substrate on a dry basis in said reaction mixture, b) maintaining the pH of said reaction mixture between about 3 to about 7, and c) maintaining the reaction mixture at about 20° C. to about 100° C. for a sufficient time to reduce the quantity of hydrogen peroxide in the reaction mixture by at least about 50% to provide a high yield of a sanitized, bleached lignocellulose fiber substrate.

One skilled in the art will recognize that the lignin component of natural polysaccharide fibers contains chromophores or color bodies which contribute to the color of the fibers. Removal of lignin will decrease the color, but as a result, the yield is reduced, eventually to pure cellulose. For the purpose of this invention, a high yield process is defined as one which at 50° C. or less has a 75% to 95% yield of a sanitized, bleached lignocellulose fiber substrate after washing when the original fiber substrate feed is oat hulls, rice bran or soybean hulls. Desirably, the yield will be at least 80%.

However, the present invention is not limited to a washing step in the process; a final washing step may be sometimes desirable, but was necessary in the examples to make a meaningful comparison of yields with the prior art controls. Yields would be even higher without a washing step. Unlike the prior art processes the present invention does not leave substantial chemical residues on the fiber such as sodium compounds and the like so that washing is not essential to the process.

The present invention also has the advantage of not consuming large amounts of energy. It does not require high temperatures which reduces the yields nor does it require evaporating large quantities of water as do other prior processes. It is essentially a "dry" process using simple, inexpensive equipment.

Suitable lignocellulose fibers may be obtained from any convenient source such as the hulls, skins and pulps of vegetables, fruits and grains. Particularly desirable are oat hulls, rice bran, soybean hulls and sugar beet pulp or residue.

Hydrogen peroxide is preferably incorporated into the reaction mixture as a spray of a dilute solution to permit easy mixing. However, if the lignocellulose fibers already contain substantial amounts of water the hydrogen peroxide may be added as a more concentrated solution. It is inadvisable to add hydrogen peroxide more concentrated than 50% by weight to dry lignocellulose fiber because of the possibility of charring or even igniting the mixture because of the heat of reaction or of heat of catalyzed decomposition.

The concentration of the aqueous hydrogen peroxide can vary from about 10% to about 50%, desirably about 20% to about 35%. The hydrogen peroxide and water both may conveniently be incorporated into the reaction mixture as fine sprays while the substantially dry substrate is tumbled by a low heat blender or mixing means such as a ribbon mill, paddle mixer or the like. The hydrogen peroxide and water should be uniformly distributed over the lignocellulose fibers to form the reaction mixture. Generally it is desirable to provide about 5 to 25 parts water per hundred parts dry lignocellulose substrate in the reaction mixture.

Commercial hydrogen peroxide usually is sufficiently acid to adjust and maintain the reaction mixture at a pH between about 3 and about 7. If desired, sufficient acid, alkali or buffer, may be incorporated into the reaction mixture to ensure that the pH will be maintained in the desired range. Such acid, alkali or buffer, may be initially incorporated into the hydrogen peroxide, the water or directly on the lignocellulose fibers.

Optionally, additives may be employed to minimize catalytic decomposition of the hydrogen peroxide leading to inefficient bleaching, or attack on the lignocellulose which would cause excessive solubilization.

The reaction mixture is reacted at about 20° C. to about 100° C. for a sufficient time to bleach and sanitize the lignocellulose fibers. It is well known that hydrogen peroxide at a concentration of about 0.1% or higher destroys most bacteria so that the minimum concentration of 5% on weight of dry fiber employed in the present invention is more than sufficient even at room temperature or below. However, the rate of bleaching increases with temperature, and it was observed that for oat hulls the desired degree of bleaching was attained after about 16 to 20 hours at 50° C. One skilled in the art can easily determine the optimum time and temperature for bleaching any particular lignocellulose fiber sample without undue experimentation. Desirably, the temperature will be maintained at about 20° C. to about 70° C.

However, it is important to avoid local overheating of the reaction mixture. A layer of the lignocellulose fibers is an effective thermal insulator so that any heat of reaction or decomposition can cause the interior of a thick layer to be at a substantially greater temperature than the exterior to cause scorching or even sufficient to ignite the fibers.

It is also important to avoid evaporating sufficient water from the reaction mixture to change from the desired composition. This may be prevented by maintaining a humidity of about 100% in the atmosphere contacting the reaction mixture.

The best mode for practicing the invention will be apparent to one skilled in the art from the following nonlimiting examples and in accordance with the following experimental directions and procedures:

Preparation of Samples for Brightness Determination

Samples which have been dried at 50° C. are ground in a Wiley mill fitted with a 0.55 mm screen. Approximately 5 g are pelletized using a 4.4 cm. hand press designed for use with an Elrepho reflectance meter.

Brightness Determination

Brightness (ISO) of the hand pressed pellets was measured with a Zeiss 2000 Elrepho reflectance meter. Yellowness values were measured concurrently with the brightness measurements.

Hydrogen Peroxide Analyses

Analyses were conducted using the standard iodometric method. Analyses reported in the attached tables are expressed as weight percent of the weight of oven dry oat hulls present.

"Wet" Bleach Procedure

A slurry containing about 160 g water and 25 g oven dry ground hulls was placed in a covered wide mouth beaker and heated to 80° C. in a microwave oven. A concentrated bleach liquor (25 ml) was mixed with the preheated pulp in a Hobart mixer for 1-2 minutes. The mixture was then returned to the covered beaker and placed in a temperature controlled bath at 70° C. for 1.5 hours.

For the first stage the pH 11.5 bleaching liquor concentrate was made by diluting to 25 ml a mixture of 3.8 ml 35% $H_2O_2$, 0.025 g $MgSO_4$, 0.5 g 40° C. Be sodium silicate, and 3.1 ml 6N NaOH.

After the Stage 1 bleaching sequence, samples were diluted to 2% consistency with deionized water. The product was then filtered through a Buchner funnel with filter paper.

Dry matter content of a small sample of the first stage product was determined by comparing weights before and after drying in a microwave oven. The damp solid was mixed with the appropriate amount of water, warmed to 80° C. in the microwave and then mixed with stabilizer concentrate in a Hobart mixer. This second stage bleaching concentrate was made up as before except that less NaOH was required to achieve the desired pH 10.5.

The combined mixture was reacted as in the first stage above. Prior to washing the solution pH was adjusted to ~5.5 with dilute $H_3PO_4$. The washed product was dried at 50° C. in forced-air oven. This process is similar to a commercial groundwood bleaching process.

U.S. Pat. No. 4,649,113 Procedure

A 1600 ml solution containing 20 g (on a 100% basis) of $H_2O_2$ was prepared. The ground substrate (80 g of 50° C. oven-dried weight) was suspended in this solution with overhead mechanical stirring. The pH was adjusted to 11.5 with NaOH and the solution volume was brought up to two liters. The reaction was allowed to stir for 24 hours at room temperature (RT). After 24 hours the substrate was neutralized to pH ~5.5 using $H_3PO_4$.

The slurry was then dried through a fine sieve (~100 mesh) and squeezed to remove excess water. The wet pulp was then diluted to 1600 ml, stirred, and again dried through a fine sieve. The product was dried at 50° C. in a forced-air oven.

Inventive "Dry" Bleach Procedure

Dry oat hulls were stirred in a Hobart mixer, 35% $H_2O_2$ and deionized water were added by means of a plastic hand sprayer until the desired peroxide level and moisture content was attained. Mixing was continued for 15 minutes, then the moist solids were transferred for reaction at the specified time and temperature. Reactions took place either in partially sealed plastic bags in a forced-air oven or in beakers immersed in a water bath as described in the "wet" procedure above.

Optional Washing Step

On completion of the reaction, the product was to 5% consistency with water. The pH was adjusted to ~5.5 with NaOH or $H_3PO_4$ and the slurry was drained through a fine mesh sieve as in the above procedures. The wash was repeated a second time and the product was isolated and dried as indicated above.

EXAMPLES

Examples 1 to 6

Samples were prepared from oat hulls according to the above procedure as indicated in Table I. Example 1 was by the process of U.S. Pat. No. 4,649,113. Examples 2, 3 and 4 were by the present "Dry Bleach" procedure. The examples were repeated, and Brightness and Yellowness determinations of the subsequent runs are indicated in parenthesis. Example 5 "Wet" Bleach was a typical two-stage wet bleach procedure. Example 6 indicated the Brightness and Yellowness of the untreated oat hulls.

Examples 7 to 11

Rice bran was processed as above. The conditions and results are presented as Table II. The Brightness and Yellowness as well as the Yield of Examples 10 and 11 (the present process) were superior to the prior art processes at a substantially lower $H_2O_2$ application rate.

Examples 12 to 16

Soybean hulls were processed as above. Results are presented as Table III.

Examples 17 to 21

Sugar beet pulp ws processed as above. Results are presented as Table IV.

TABLE I

COMPARISON OF BLEACHING OF GROUND OAT HULLS

| Example | Reaction Type | % $H_2O_2$ Dry Matter | Brightness | Yellowness | Temp. °C. | Time (hrs.) | % Dry Matter (Consistency) | % $H_2O_2$ Residual | Yield % |
|---|---|---|---|---|---|---|---|---|---|
| 1 | U.S. Pat. No. 4,649,113 [pH 11.5] | 25 | 52 | 37 | 25 | 20 | 4 | 4 | 50 |
| 2 | "Dry" Bleach[1] [pH 5-7] | 15 | 49(44) | 39(42) | 50 | 16 | 65 | 5-10 | 85-90 |
| 3 | "Dry" Bleach[1] [pH 5-7] | 10 | 46(43) | 45(44) | 50 | 16 | ~70 | 3-4 | 85-90 |
| 4 | "Dry" Bleach[1] [pH 5-7] | 5 | 35(37) | 45(47) | 50 | 16 | ~70 | 1-2 | 90 |
| 5 | "Wet" Bleach [pH 11.5] | 2 × 5<br>2 × 1.5 | 35<br>29 | 55<br>58 | 70<br>70 | 2 × 1.5<br>2 × 1.5 | 12<br>12 | 2.0<br><0.4 | 70<br>70 |
| 6 | Untreated Hulls | | 28 | 50 | | | | | |

[1]Samples in ( ) were run as replicates
[2]Wet bleach was done in two separate stages (2×), the 1st at pH 11.5, 2nd at pH 10.5.

TABLE II

COMPARISON OF BLEACHING OF RICE BRAN

| Example | $H_2O_2$ % D.M. | Brightness | Yellowness | Temp. °C. | Yield |
|---|---|---|---|---|---|
| 7 Untreated | — | 26 | 51 | — | — |
| 8 U.S. Pat. No. 4,649,113 | 25 | 29 | 55 | RT | 35 |
| 9 "Wet" Bleach | 2 × 5* | 25 | 58 | 70 | 55 |
| 10a "Dry" Bleach | 15 | 42 | 46 | 70 | 60 |
| 10b "Dry" Bleach | 15 | 39 | 46 | 50 | 75 |
| 11a "Dry" Bleach | 10 | 37 | 49 | 70 | 75 |
| 11b "Dry" Bleach | 10 | 32 | 49 | 50 | 85 |

*Two stages, the first at pH 11.5, the second at pH 10.5
RT = Room Temperature

TABLE III

COMPARISON BLEACHING OF SOYBEAN HULLS

| Example | $H_2O_2$ % D.M. | Brightness | Yellowness | Yield |
|---|---|---|---|---|
| 12 Untreated | — | 24 | 54 | — |
| 13 U.S. Pat. No. 4,649,113 | 25 | 44 | 42 | 70 |
| 14 "Wet" Process | 2 × 5 | 33 | 51 | 65 |
| 15 "Dry" Process | 15 | 38 | 41 | 80 |
| 16 "Dry" Process | 10 | 34 | 47 | 85 |

TABLE IV

COMPARISON BLEACHING OF SUGAR BEET RESIDUE

| Example | $H_2O_2$ % D.M. | Brightness | Yellowness | Yield |
|---|---|---|---|---|
| 17 Untreated | — | 27 | 49 | — |
| 18 U.S. Pat. No. 4,649,113 | 25 | 44 | 37 | 50 |
| 19 "Wet" Process | 2 × 1.5 | 28 | 53 | 75 |
| 20 "Dry" Process | 15 | 44 | 37 | 70 |
| 21 "Dry" Process | 10 | 39 | 37 | 70 |

I claim:

1. A high yield process for treating a lignocellulose fiber substrate comprising:
   a) uniformly distributing a sufficient quantity of an aqueous solution containing hydrogen peroxide over the lignocellulose fiber substrate to provide as a reaction mixture about 5 to 15 parts by weight hydrogen peroxide per hundred parts by weight dry lignocellulose fiber substrate and about 5 to 25 parts water per hundred parts dry lignocellulose substrate to provide about 50 to 70 parts lignocellulose fiber substrate on a dry basis in said reaction mixture,
   b) maintaining the pH of said reaction mixture to about 3 to about 7, and
   c) maintaining the reaction mixture at about 20° C. to about 100° C. for a sufficient time to reduce the quantity of hydrogen peroxide in the reaction mixture by at least about 50% to provide a high yield of a sanitized, bleached lignocellulose fiber substrate.

2. The process of claim 1 wherein the lignocellulose fiber substrate is selected from the group consisting of oat hulls, rice bran, sugar beet fiber and soybean hulls.

3. The process of claim 1 wherein the bleached reaction mixture from step c is washed.

4. The process of claim 2 wherein the bleached reaction mixture from step c is washed.

5. The process of claim 1 wherein the temperature is maintained between about 20° C. and about 70° C.

6. The process of claim 2 wherein the temperature is maintained between about 20° C. and about 70° C.

7. The process of claim 3 wherein the temperature is maintained between about 20° C. and about 70° C.

8. The process of claim 4 wherein the temperature is maintained between about 20° C. and about 70° C.

* * * * *